United States Patent Office 3,420,792
Patented Jan. 7, 1969

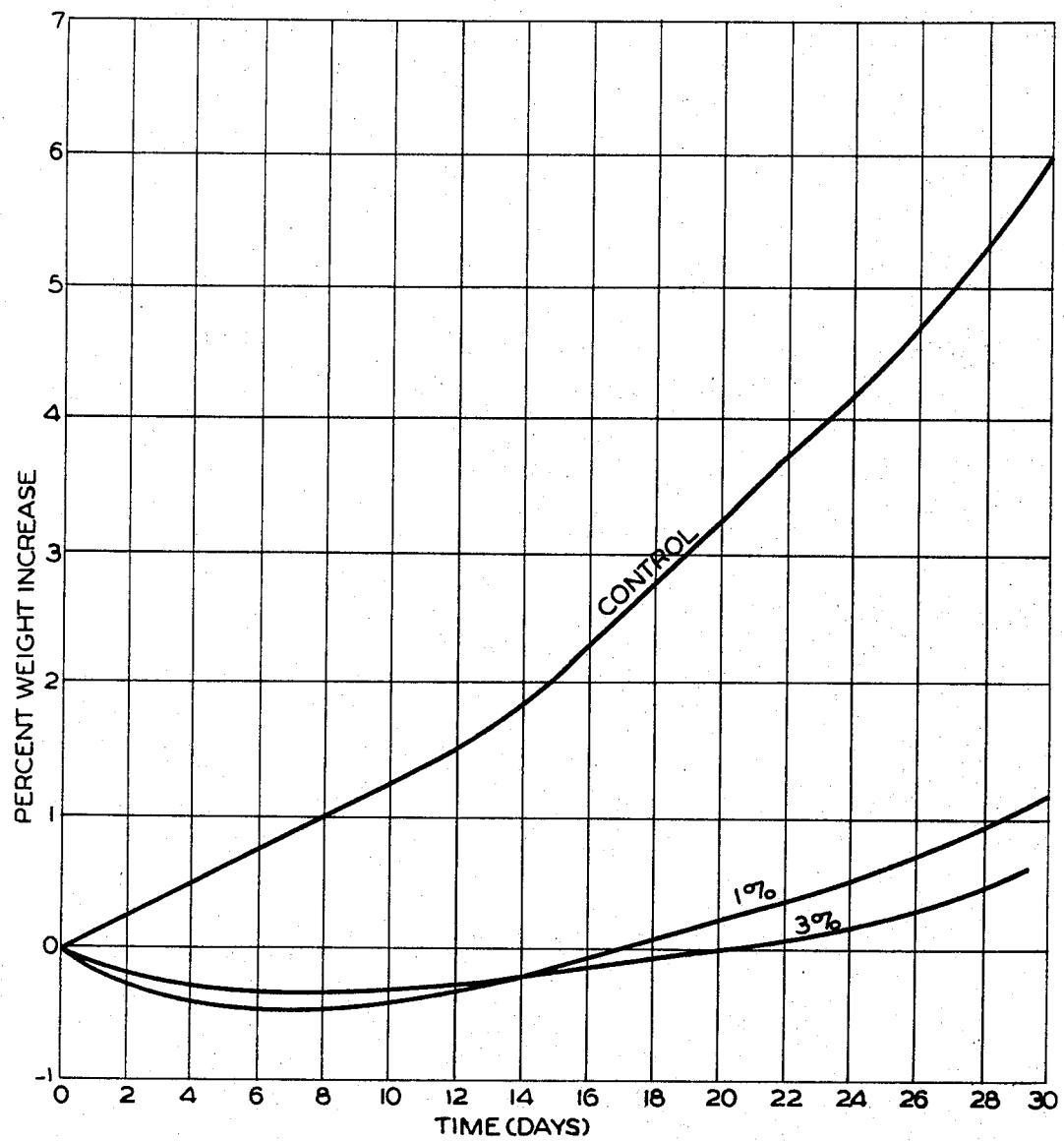

3,420,792
STABILIZED POLYPHENYLENE ETHER
Robert H. Zuccaro, Burlington, Mass., assignor to General Electric Company, a corporation of New York
Filed Jan. 18, 1967, Ser. No. 610,134
U.S. Cl. 260—45.9  5 Claims
Int. Cl. C08f 45/60; C08g 51/60; C08g 43/00

ABSTRACT OF THE DISCLOSURE

A stabilized polyphenylene ether composition consisting of a major portion of a polyphenylene ether and a minor portion of a hexaalkylphosphoric triamide stabilizer.

---

This invention relates to polyphenylene ether plastics, and more particularly, to the stabilization of such plastics with a hexaalkylphosphoric triamide.

It is known that the polyphenylene ethers, and particularly, the 2,6-dialkyl substituted polyphenylene ethers, are somewhat unstable under the influence of heat and light exposure causing the resin to become dark colored, brittle and undesirable for many uses. The cause of the degradation is not fully understood, but is believed to be due, in part, to the presence of hydroxyl groups on the polymer chain and the degradative effect of traces of impurities present in the polymer composition.

The term "polyphenylene ether" includes those polymers disclosed and claimed in copending U.S. patent applications of Allan S. Hay, Ser. Nos. 212,127, and 212,128, the polymers disclosed and claimed in U.S. Patents Nos. 3,257,357 and 3,257,358 of Gelu Stoeff Stamatoff (all incorporated herein by reference) and various copolymers and blends of the polyphenylene ethers formed by copolymerization or blending the polyphenylene ethers with other monomers or polymers such as the polyolefins, polystyrenes, polycarbonates and the like wherein the polyphenylene ether is present in an amount sufficient to effect the properties of the polymer composition due to the influence of heat and light.

Heretofore, a large number of different compounds such as the phenolic antioxidants exemplified by p-phenylphenol, N-steroyl-p-aminophenol and 2,2'-methylene-bis (4-ethyl-6-tert.butylphenol) have been used as heat and light stabilizers for polyphenylene ether compositions. These stabilizers were generally unsatisfactory for even short exposures to heat. Other stabilizers such as the ketenes, benzoic anhydride and the mercaptobenzimidazoles have also been tried and found to be effective for short periods of exposure to heat, but not for the relatively long exposures required for many commercial applications.

It has now been found that the addition of a small amount of a hexaalkylphosphoric triamide represented by the following general formula:

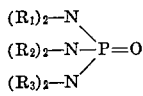

wherein $R_1$, $R_2$ and $R_3$ represent alkyl groups of from 1 to 6 carbon atoms is a highly effective stabilizer for the polyphenylene ethers. The amount of stabilizer added depends upon its activity, the quality of the polymer to be stabilized and the conditions to which the polymer is to be exposed. The stabilizer may be added in an amount of between about 0.01 and about 10% by weight, calculated on the polymer and preferably in an amount of between 0.1 and 4.0% by weight calculated on the polymer.

The manner of adding the stabilizer to the polyphenylene ether is not critical to the invention. Hence, any convenient method can be employed. For example, the stabilizer can be dry blended with resin powder in a blender such as a Waring blender. Alternatively, the resin can be dissolved in a suitable solvent and the stabilizer added to the solution. The stabilized polymer may then be recovered from solution. A third method involves dissolving the stabilizer in a solvent and mixing the solution with dry powder.

The stabilized compositions of this invention are useful for all purposes for which the polyphenylene ethers have heretofore been used, for example, for conversion to films, fibers, molded articles and the like by conventional methods.

The following examples serve to illustrate the invention but they are not intended to limit it thereto, the parts being by weight unless otherwise stated.

Example 1

Three films were prepared from poly-(2,6-dimethyl-1,4-phenylene) ether by compression molding using a Carver laboratory press. Power was preheated in an open press at 300° C. for 1 minute and thereafter pressed at 8,000 p.s.i. for ½ minute. The resulting film was 15 mils thick, clear and light yellow in color. One film, designated Sample A, was a control sample free of stabilizer. The second film, designated Sample B, contained 1% hexamethylphosphoric triamide. The third film, designated Sample C, contained 3% hexamethylphosphoric triamide. The three samples were placed in an open air oven maintained at 150° C. for 30 days.

The time to embrittlement for each of the samples was determined by folding a strip of the film at various times during the heat aging process until the film reached a point where it snapped apart when partially folded. It was found that the time of embrittlement for the control sample was 10 days, the time of embrittlement for the sample containing 1% hexamethylphosphoric triamide was 28 days and the time to embrittlement for the sample containing 3% hexamethylphosphoric triamide was 30 days.

The change in weight of each of the samples during the 30 days aging period was determined because this is an indication of oxygen uptake during the aging process. The results obtained are illustrated in FIGURE 1. From FIGURE 1, it can be seen that the samples containing the hexamethylphosphoric triamide during the first 20 days of aging. This is due to the loss of residual volatiles. Thereafter, there was a slight weight gain for the stabilized samples. On the other hand, the control sample free of stabilizer immediately started gaining weight upon exposure to the elevated temperature and after 30 days of aging, increased in weight by 6%. This indicates considerable oxygen uptake.

It is to be understood that the foregoing detailed description is given merely by way of illustration and that many variations may be made therein without departing from the spirit of our invention.

What I claim as new and desire to secure by Letters Patent of the United States is:

1. A stabilized polyphenylene ether composition consisting essentially of a major amount of a polyphenylene ether and a stabilizing amount of hexaalkylphosphoric triamide as represented by the following general formula:

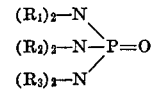

wherein $R_1$, $R_2$ and $R_3$ represent $C_1$ to $C_6$ alkyl groups.

2. The stabilized polyphenylene ether composition of claim 1 wherein the polyphenylene ether is poly-(2,6-dimethyl-1,4-phenylene) ether.

3. The stabilized polythenylene ether composition of claim 2 wherein the stabilizer is hexamethylphosphoric triamide.

4. The stabilized polyphenylene ether composition of claim 3 wherein the hexamethylphosphoric triamide is present in an amount ranging between 0.01 and 10%, by weight of the polyphenylene ether.

5. The stabilized polyphenylene ether composition of claim 3 wherein the hexamethylphosphoric triamide is present in an amount ranging between 0.1 to 4%, by weight of the polyphenylene ether.

References Cited
UNITED STATES PATENTS

| | | | |
|---|---|---|---|
| 3,100,197 | 8/1963 | Heuck et al. | 260—45.9 |
| 3,134,753 | 5/1964 | Kwiatek | 260—47 |
| 3,257,357 | 6/1966 | Stamatoff | 260—47 |
| 3,306,874 | 2/1967 | Hay | 260—47 |

DONALD E. CZAJA, *Primary Examiner.*

H. E. TAYLOR, *Assistant Examiner.*

U.S. Cl. X.R.

260—959, 47, 45.8, 45.95, 47